Oct. 4, 1927.  
W. Z. PULLIAM  
1,644,031  
CENTRIFUGAL SPREADER  
Filed Dec. 6, 1926  
2 Sheets-Sheet 1
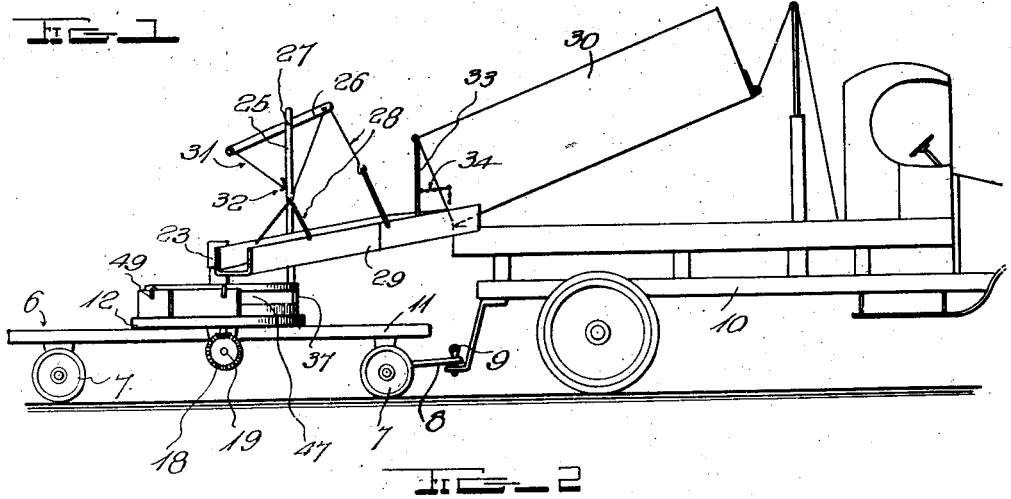
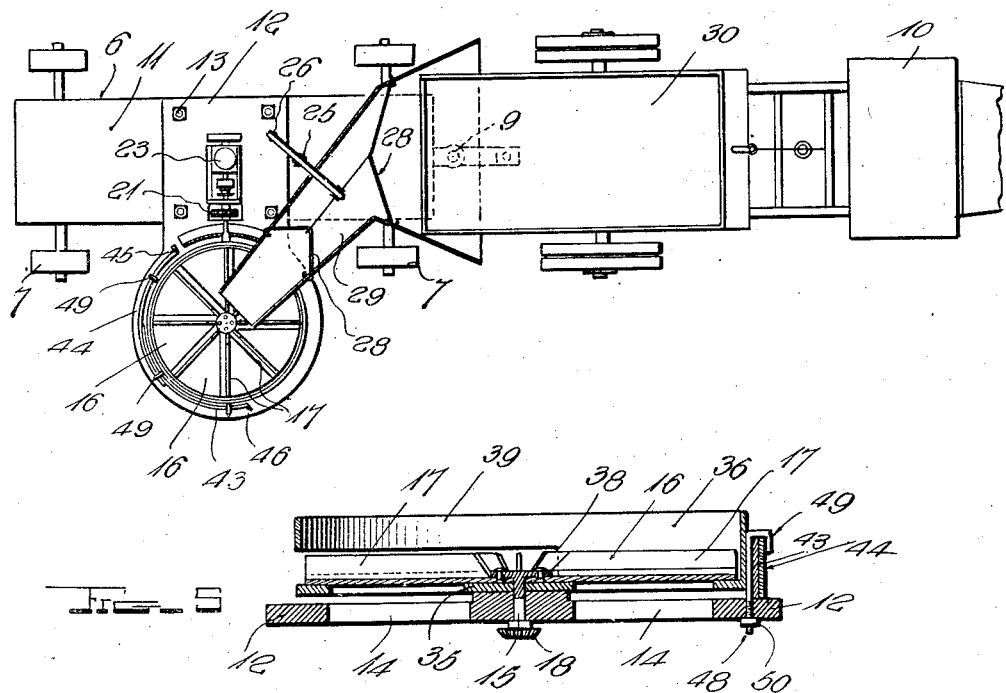
Inventor  
W. Z. Pulliam  
Witness  
By H. B. Wilson &co  
Attorneys

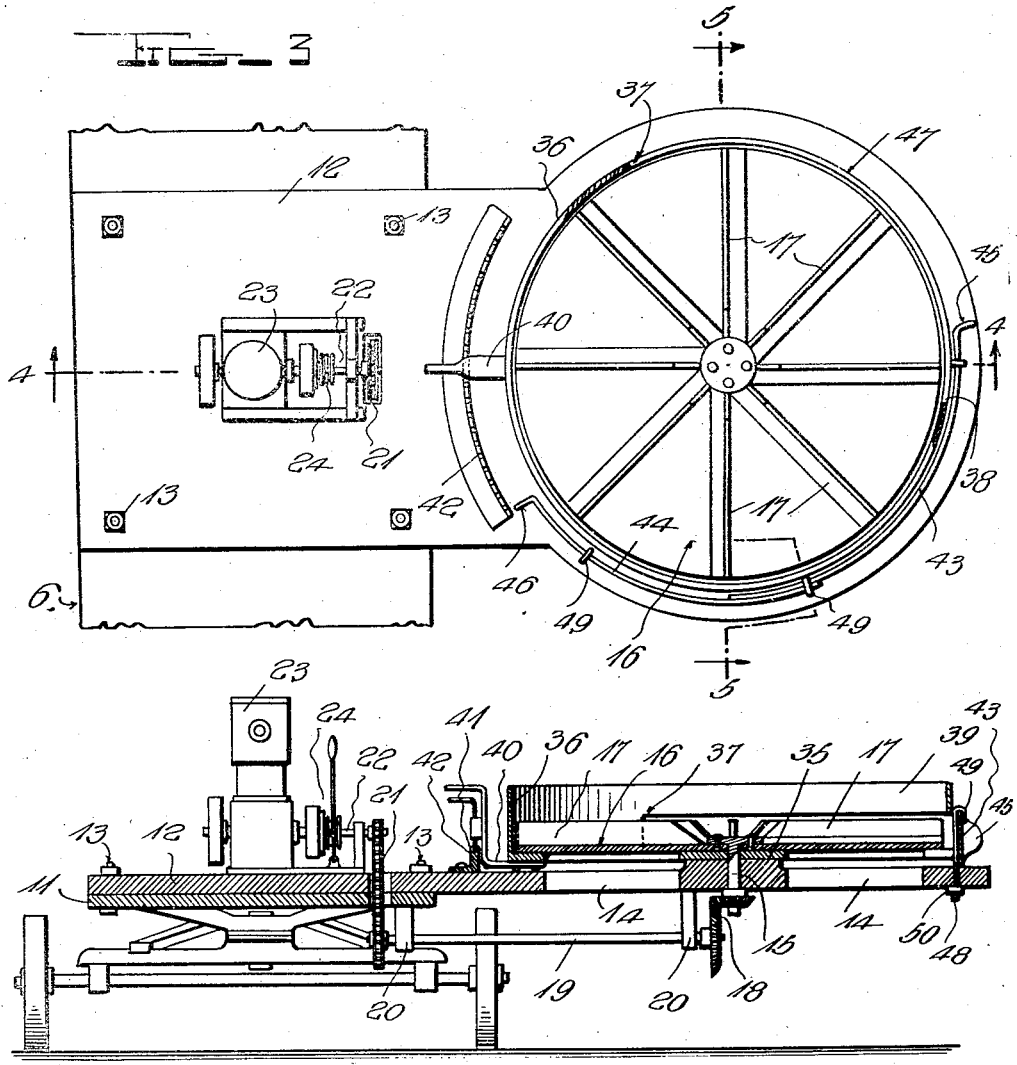

Patented Oct. 4, 1927.

1,644,031

UNITED STATES PATENT OFFICE.

WILLIAM Z. PULLIAM, OF INGLEWOOD, CALIFORNIA.

CENTRIFUGAL SPREADER.

Application filed December 6, 1926. Serial No. 153,007.

The invention relates to improvements in spreaders designed primarily for spreading sand or gravel upon roadways, and it is one object of the invention to provide a new and improved construction and relation of parts, whereby not only the quantity discharged by the centrifugal spreader, but the direction of discharge, may be controlled.

Another object of the invention is to provide a centrifugal spreader mounted in a novel manner upon a trailer for attachment to a truck, and provided with means for conducting material from the truck to the spreader, the trailer and parts carried thereby being disconnectible readily from the truck when all of the truck contents have been distributed by the spreader.

With the foregoing in view, the invention resides in the novel subject matter hereinafter described and claimed, the description being supplemented by the accompanying drawings.

Fig. 1 is a side elevation showing the spreader attached to a truck.

Fig. 2 is a top plan view of the parts shown in Fig. 1.

Fig. 3 is an enlarged fragmentary plan view of the centrifugal spreader and associated elements, parts being shown in horizontal section.

Fig. 4 is a vertical transverse sectional view on line 4—4 of Fig. 3.

Fig. 5 is an additional vertical section on the plane of line 5—5 of Fig. 3.

The numeral 6 designates a trailer provided with wheels 7 and a stub tongue 8 adapted to be detachably hitched at 9 to a motor truck 10. Resting upon the body 11 of this trailer and projecting laterally from it, is a horizontal supporting plate 12, any desired means such as bolts 13, being employed for securing said plate and body together. The laterally projecting end of the supporting plate 12 is preferably formed with openings 14 for sake of lightness and to prevent accumulation of sand and the like thereon. An upright shaft 15 is rotatably mounted in any desired manner upon this laterally projecting portion of the plate 12, the upper end of said shaft being provided with a rotor 16 for spreading the sand, gravel or the like centrifugally, the upper side of said rotor having radial vanes 17. By appropriate gearing 18, the other end of the shaft 15 is connected operatively with a transverse horizontal shaft 19 which is rotatably carried by suitable bearing hangers 20. By a chain 21 and sprockets, the inner end of shaft 19 is connected with a drive shaft 22 above the trailer body 11. A suitable motor 23 is carried by this trailer and is preferably mounted upon the inner end of the plate 12 for rotating the shaft 22, and an appropriate clutch 24 may be provided between said shaft and motor.

In the present showing, a standard 25 rises from the front portion of the trailer body 11, and a lever 26 is fulcrumed between its ends at 27 to the upper end of said standard. By suitable hangers 28, one end of this lever supports an appropriate chute 29 whose function is to conduct material from the rear end of the truck body 30 onto the rotor 16. Any desired means, such as a cable 31 and cleat 32 may be provided to hold the lever 26 against further movement after it has been swung about its fulcrum to adjust the chute 29 to the most desirable position. The tail-gate 33 of the body 30 is preferably held against excessive opening by chains or the like 34 and when the body 30 is inclined as shown in Fig. 1 and the tail-gate properly set, material from said body will slide down the chute 29 onto the rotor 16 and will by the latter be distributed over the roadway or other surface to be coated.

Novel provision is made for controlling the discharge of material from the rotor 16. In the present showing, a horizontal spider or plate 35 is pivotally mounted between the rotor 16 and the supporting plate 12, the shaft 15 serving as a pivot for said plate. The peripheral portion of this plate is provided with an upstanding wall 36 which extends around a portion of the rotor's periphery, the ends of the effective portion of said wall being denoted at 37 and 38. These ends may be connected by an arcuate wall portion 39 disposed slightly above the plane of the rotor 16, if desired.

Secured to and projecting inwardly from the plate 35, over the supporting plate 12, is an arm 40 which may be used for turning the plate and the wall 36 about the shaft 15 as a pivot. To then hold these parts in adjusted position, I may well make use of a dog 41 and a curved rack 42, the former being mounted on the lever or arm 40 while the rack is secured to the plate 12.

An additional arcuate wall rises from the outer ends of the plate 12 and co-operates with the wall 36 in controlling the discharge of material from the rotor 16. This additional wall, in the present showing, is formed of two slidably overlapped sections 43 and 44, both of which rest slidably upon the outer end of the plate 12. The outer ends of these wall sections 43 and 44 are preferably directed outwardly at 45 and 46 respectively, forming handles by means of which they may be slid relatively or simultaneously about the periphery of the rotor 16. The end 45 co-operates with the end 37 of the wall 36, in forming a discharge throat 47 for the sand, gravel or the like, and it will be seen that said end 45 may be extended any desired extent beyond the end 38 of the wall 36, so that the size of the throat 47 may be controlled. It will also be observed that by making proper circumferential adjustment of the wall 36 and the wall 43—44, the direction of discharge from the spreader may be varied as occasion may demand.

For slidably mounting the wall sections 43—44 and for securing them tightly against the plate 12 after they have been adjusted, I may well make use of bolts 48 passing through said plate 12 and having hooks 49 at their upper ends, engaging the wall sections 43—44, the lower ends of these bolts being provided with nuts 50 at the lower side of the plate 12. Loosening of these nuts, permits circumferential sliding of the wall sections 43—44, whereas tightening of said nuts will effectively clamp said sections in adjusted position.

By the novel construction shown and described or a substantial equivalent thereof, a spreader is provided which is rather simple and inexpensive, yet will be efficient and in every way desirable. The general construction shown is preferably followed, but within the scope of the invention as clamed, variations may of course be made.

I claim:—

1. In a centrifugal spreader, a rotor upon which to deposit material to be spread, a stationary support upon which said rotor is mounted, a movable plate interposed between the support and the rotor and mounted for pivotal movement about the axis of the latter, an arcuate wall rising from said movable plate at the periphery of said rotor, means for holding said movable plate after pivotal movement thereof to circumferentially adjust said wall, and a second arcuate wall rising from said support at the outer side of the first named wall, said second wall having an end cooperable with the opposed end of the first named wall in forming an outlet throat whose size may be varied by the above-named pivotal movement of the plate.

2. In a centrifugal spreader, a rotor upon which to deposit material to be spread, a stationary support upon which said rotor is mounted, a movable plate interposed between the support and the rotor and mounted for pivotal movement about the axis of the latter, an arcuate wall rising from said movable plate at the periphery of said rotor, means for holding said movable plate after pivotal movement thereof to circumferentially adjust said wall, a second arcuate wall rising from said support at the outer side of the first named wall, said second wall having at least a portion slidably engaging the support and spaced from one end of the first named wall to provide an outlet throat therebetween, the width of said throat and its position being variable by circumferential adjustment of the first named wall and said portion of the second wall, an arm secured to and projecting inwardly from said movable plate over said stationary support whereby said movable plate may be turned, a curved rack on said stationary support and a dog carried by said arm and adapted to engage said rack for securing said movable plate and its wall portion to the support after adjustment and means for securing said wall portion to the support after adjustment.

3. In a centrifugal spreader, a rotor upon which to deposit material to be spread, a stationary support upon which said rotor is mounted, a movable plate interposed between the support and the rotor and mounted for pivotal movement about the axis of the latter, an arcuate wall rising from said movable plate at the periphery of said rotor, means for holding said movable plate after pivotal movement thereof to circumferentially adjust said wall, a second arcuate wall rising from said support at the outer side of the first named wall, said second wall having at least a portion slidably resting on the support and spaced from one end of the first named wall to provide an outlet throat therebetween, the width of said throat and its position being variable by circumferential adjustment of the first named wall and said portion of the second wall, bolts passing through the support and having hooks engaging the upper edge of the second named wall, and nuts threaded on said bolts under the support to downwardly draw said second named wall and clamp it to the support.

4. A spreader comprising a wheeled trailer and means for connecting it with a truck, a support secured to and projecting laterally from the trailer body, a centrifugal spreader mounted on said support, a trailer-carried motor operatively connected with said spreader for driving the same, and trailer-carried means for conducting material to said spreader from the truck.

5. A spreader comprising a wheeled trailer and means for connecting it with a truck, a support secured to and projecting laterally from the trailer body, a centrifugal spreader mounted on said support, a trailer-carried motor operatively connected with said spreader for driving the same, a standard rising from the trailer, a lever fulcrumed between its ends to said standard, a chute suspended from one end of said lever and disposed to conduct material to the spreader from the truck, and means connecting the lever with the standard for holding the former when swung to different positions to raise or lower the chute.

In testimony whereof I have hereunto affixed my signature.

WILLIAM Z. PULLIAM.